US010875561B1

(12) United States Patent
Marker (10) Patent No.: US 10,875,561 B1
(45) Date of Patent: Dec. 29, 2020

(54) TRANSPORTATION ASSEMBLY FOR A DISPLAY DEVICE

(71) Applicant: Thomas M. Marker, Howell, NJ (US)

(72) Inventor: Thomas M. Marker, Howell, NJ (US)

( * ) Notice: Subject to any disclaimer, the term of this patent is extended or adjusted under 35 U.S.C. 154(b) by 0 days.

(21) Appl. No.: 16/382,370

(22) Filed: Apr. 12, 2019

Related U.S. Application Data

(60) Provisional application No. 62/656,527, filed on Apr. 12, 2018.

(51) Int. Cl.
*B62B 3/02* (2006.01)
*B62B 3/10* (2006.01)
*B62B 5/00* (2006.01)
*B62B 3/04* (2006.01)

(52) U.S. Cl.
CPC ............... *B62B 3/022* (2013.01); *B62B 3/04* (2013.01); *B62B 3/10* (2013.01); *B62B 5/00* (2013.01); *B62B 5/0013* (2013.01)

(58) Field of Classification Search
CPC .. B62B 3/022; B62B 3/04; B62B 3/10; B62B 3/108; B62B 3/14
See application file for complete search history.

(56) References Cited

U.S. PATENT DOCUMENTS

| | | | | |
|---|---|---|---|---|
| 3,765,550 A | * | 10/1973 | Tausheck | B62B 3/108 414/541 |
| 4,478,429 A | * | 10/1984 | Adams | B62B 3/108 280/47.29 |
| 4,488,733 A | * | 12/1984 | Hellsten | B62B 3/108 280/47.16 |
| 4,758,712 A | | 7/1988 | Matone, Jr. et al. | |
| 5,122,928 A | | 6/1992 | Lo | |
| 5,253,139 A | | 10/1993 | Satou | |
| 5,403,082 A | * | 4/1995 | Kramer | A47B 21/00 108/115 |
| 6,360,797 B1 | * | 3/2002 | Brazell | B23D 47/025 144/286.1 |
| 6,914,772 B2 | | 7/2005 | Hesse et al. | |

(Continued)

OTHER PUBLICATIONS

"CO-Z Mobile Motorized TV Lift Floor Stands Rolling TV Carts for Flat Screen 32 to 65 Inches TVs with Wheels Shelves Height Adjustable with Remote Controller" | Amazon.com | website available at <https://www.amazon.com/dp/B0786YF7TL?tag=amz-mkt-chr-us-20&ascsubtag=1ba00-01000-a0049-win10-other-nomod-us000-pcomp-feature-scomp-wm-5&ref=aa_scomp_srdg2> | printed on Jun. 18, 2020, dated Dec. 11, 2017.

(Continued)

*Primary Examiner* — Erez Gurari
(74) *Attorney, Agent, or Firm* — Hanrahan Law Firm P.A.; Benjamin M. Hanrahan (57) ABSTRACT

A transportation assembly structured and configured to facilitate the storage, transportation, and use (e.g., viewing) of a television or other display device is presented herein. The transportation assembly includes a positioning assembly structured to movably mount or support the display device to a main body. In particular, the positioning assembly includes a linear actuator as well as guide rails to selectively position the display device between a raised position and a lowered position. A plurality of collapsible legs are provided to allow the assembly to be either transported on wheels while the legs are extended or placed into a vehicle while the legs are collapsed.

19 Claims, 12 Drawing Sheets

(56) References Cited

U.S. PATENT DOCUMENTS

| | | | |
|---|---|---|---|
| 6,919,678 B2 | 7/2005 | Ozolins et al. | |
| 7,151,662 B2 | 12/2006 | Tarkoff et al. | |
| 7,511,630 B2 | 3/2009 | Strickland et al. | |
| 7,623,958 B1 | 11/2009 | Laverick et al. | |
| 8,717,751 B2 | 5/2014 | Marker | |
| 9,149,131 B2 * | 10/2015 | Taylor | A47F 3/14 |
| 9,462,882 B2 * | 10/2016 | Epstein | H04N 5/268 |
| 10,421,183 B2 * | 9/2019 | Firth | B25H 1/08 |
| 2002/0062686 A1 * | 5/2002 | Keaton | B60P 1/4421 |
| | | | 73/116.01 |
| 2003/0184961 A1 | 10/2003 | Ahn | |
| 2004/0112143 A1 | 6/2004 | Richardson | |
| 2006/0023412 A1 | 2/2006 | Schedivy | |
| 2007/0080446 A1 | 4/2007 | Maloney | |
| 2008/0066598 A1 * | 3/2008 | Ouellette | B27B 5/165 |
| | | | 83/477.2 |
| 2008/0254862 A1 * | 10/2008 | Mattice | G07F 17/32 |
| | | | 463/25 |
| 2008/0297998 A1 | 12/2008 | Choi | |
| 2008/0316687 A1 | 12/2008 | Richardson et al. | |
| 2009/0040698 A1 | 2/2009 | Merz et al. | |
| 2009/0078509 A1 * | 3/2009 | Olsen | B66F 7/065 |
| | | | 187/211 |
| 2009/0097191 A1 | 4/2009 | Roberts et al. | |
| 2009/0231808 A1 | 9/2009 | Burgner | |
| 2009/0257207 A1 | 10/2009 | Wang et al. | |
| 2015/0351719 A1 * | 12/2015 | Ninomiya | A61B 8/4405 |
| | | | 348/163 |
| 2016/0129825 A1 * | 5/2016 | Parker | B60P 1/4414 |
| | | | 414/343 |
| 2016/0264165 A1 * | 9/2016 | Stokes | B62B 5/0013 |
| 2019/0023298 A1 * | 1/2019 | Carzola | B62B 3/10 |
| 2019/0347060 A1 * | 11/2019 | Vanti | B62B 3/10 |
| 2020/0023876 A1 * | 1/2020 | Puleo, Jr. | B62B 3/008 |

OTHER PUBLICATIONS

Johnson, Eric, et al. | "File Design Report—Personal Utility Cart" | available at <https://digitalcommons.calpoly.edu/cgi/viewcontent.cgi?article=1411&context=mesp> | dated Jun. 2, 2017 | San Luis Obispo, U.S.A.

* cited by examiner

TRANSPORTATION ASSEMBLY FOR A DISPLAY DEVICE

CLAIM OF PRIORITY/CROSS-REFERENCE TO RELATED APPLICATION

The present application is based on and a claim of priority is made under 35 U.S.C. § 119(e) to provisional patent application Ser. No. 62/656,527, filed on Apr. 12, 2018, the content of which is incorporated herein in its entirety by reference.

FIELD OF THE INVENTION

The present invention is generally directed to a transportation unit or assembly structured to protect and facilitate transportation of an electronic device, such as, but not limited to a television, monitor or other display device.

BACKGROUND OF THE INVENTION

The transportation of a television, monitor or other display device can occur under many different circumstances and over many different environments. As just an example, it may be desirable to display media (e.g., videos, movies, photographs, presentations, computer displays, etc.) on a large screen in locations other than indoors, for purposes of entertainment, education, employee training, or other instances. In those cases, a television, monitor or other display device may need to be transported from indoors or from a vehicle to the desired location. In other cases, a television or display device may need to be transported from one location to another, such as, from one office to another office or to a courtroom for a presentation, as an example.

Although televisions, monitors and display devices have become much thinner and lighter over the last decade or more, it can still be difficult and cumbersome to transport them over long distances, for example by hand or by carrying them. In some cases, it may be desirable to place the display device on top of a wheeled cart and push or otherwise maneuver the cart to the desired location. However, even that can be difficult to transport, particularly over uneven terrain or surfaces, such as gravel, cobblestones, grass, etc.

Since the television, monitor or display device should often or always be oriented in an upright position, e.g., not placed with the screen side facing down or up, the large size of the television or display device can often cause difficulty during transportation on a wheeled cart even over smooth surfaces, or paved surfaces. For example, the television may have a high center of gravity above the top surface of the cart which can cause the cart to be unstable and/or tip over during wheeled transportation over any surface, whether smooth surfaces, uneven surfaces, even surfaces, rocky surfaces, or otherwise.

Accordingly, there is a need in the art for an assembly or unit that can be used to easily transport a television, monitor or other display device from one location to another. The assembly should be able to lower the center of gravity, e.g., by lowering the display device, during wheeled transportation. Other advantages of the proposed assembly as disclosed and described herein.

SUMMARY OF THE INVENTION

In particular, the present invention is generally directed to a transportation assembly for the easy transportation of a television, monitor or other display device from one location to another. A positioning assembly is included to selectively position the display device between an upright or raised position and a lowered position through a slot or channel disposed in a main body.

Extending below the main body is a plurality of legs or other support assembly, which in some embodiments, can be collapsible or foldable, similar to a gurney style cart or platform. For example, the legs may be folded upward and into or against a bottom portion or bottom surface of the main body, or extended downward in a supporting, extended or deployed position.

In any event, the positioning assembly can be used to raise the television or other display device, for example, when the television or display device is being used to display media, such as a video, photographs, presentation, computer display, etc. While the television or display device is being used to display media, or otherwise, while the display device is disposed in the raised position, the legs can be disposed in either the extended, supporting position or in the collapsed position. For example, with the legs extended downward, the legs can be used to support the assembly on a surface, such as the ground. Alternatively, with the legs folded or collapsed, the assembly can be either placed on the ground (and therefore lower than if the legs were extended) or upon a supporting surface, such as a table, stand, etc.

When the television or display device is to be moved via the assembly of the present invention, with the legs extended downward in the supporting position, the television or other display device can be lowered downward, for example, via the positioning assembly, thereby lowering the center of gravity, as well. With the center of gravity of the entire unit or assembly lowered, the assembly can be easily traversed or maneuvered over rough ground, parking lots, pavement, smooth surfaces, etc.

Another advantage of at least one embodiment of the present invention is that the assembly can also be easily placed into and removed from a vehicle. For example, the legs can be easily folded upward, with the television or display screen raised, similar to an emergency gurney entering or exiting an emergency vehicle or ambulance. Specifically, after transporting the assembly to the vehicle, e.g., with the display screen lowered, the display screen can be raised, and the legs can be easily folded or collapsed. An additional set of wheels, e.g., short secondary wheels in close proximity to the main body, can be used to easily wheel the assembly into a vehicle, such as a sport utility vehicle (SUV), van, pick-up truck, etc. or onto a stand or into a storage location.

The entire assembly can then be removed from the vehicle or other location, and after deploying the legs into the extended position, the assembly can be maneuvered and transported to another location. Then, in order to use or view the display device, the display device is simply raised up and turned on.

These and other objects, features and advantages of the present invention will become more apparent when the drawings as well as the detailed description are taken into consideration.

BRIEF DESCRIPTION OF THE DRAWINGS

Like reference numerals refer to like parts throughout the several views of the drawings provided herein.

DETAILED DESCRIPTION OF THE INVENTION

Figure 1:
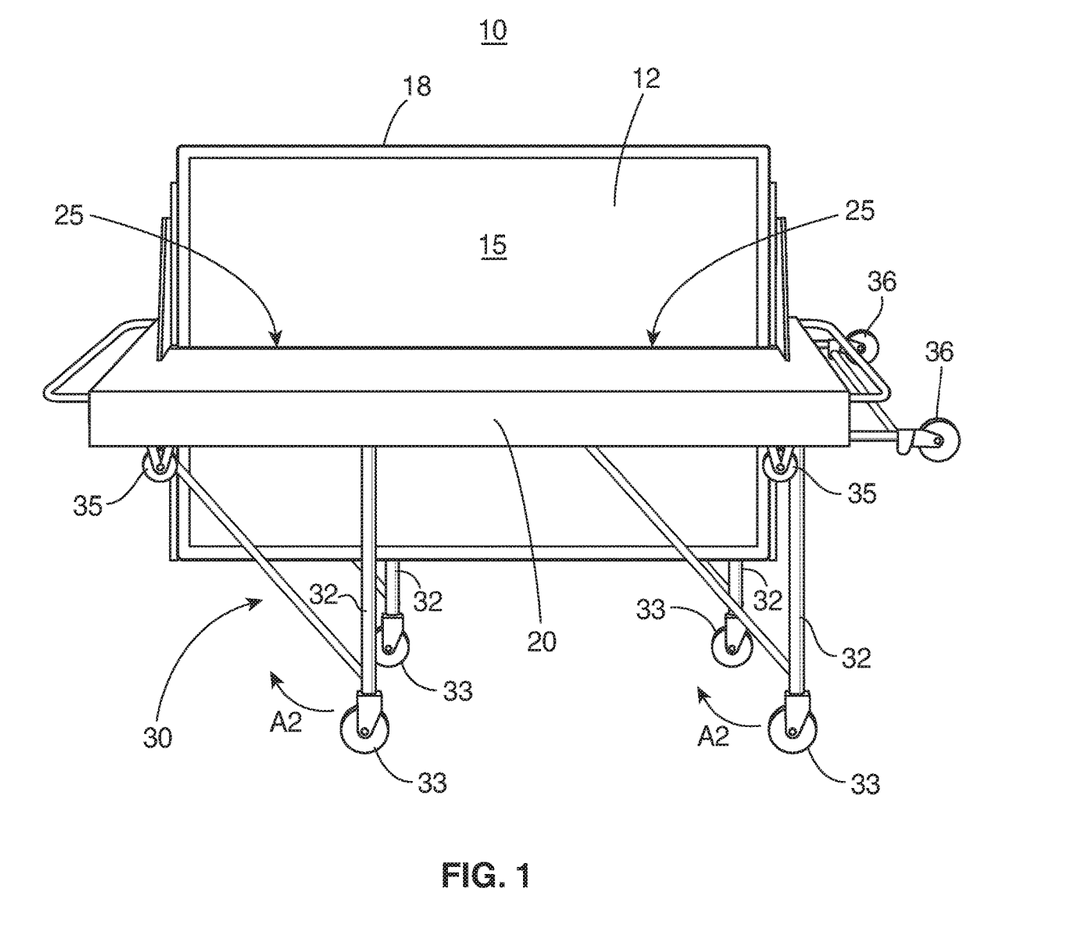
FIG. 1 is a front view of the assembly with the display device disposed in a lowered position and with the support assembly or legs disposed in an extended, supporting position, as disclosed in accordance with at least one embodiment of the present invention.
Figure 2:
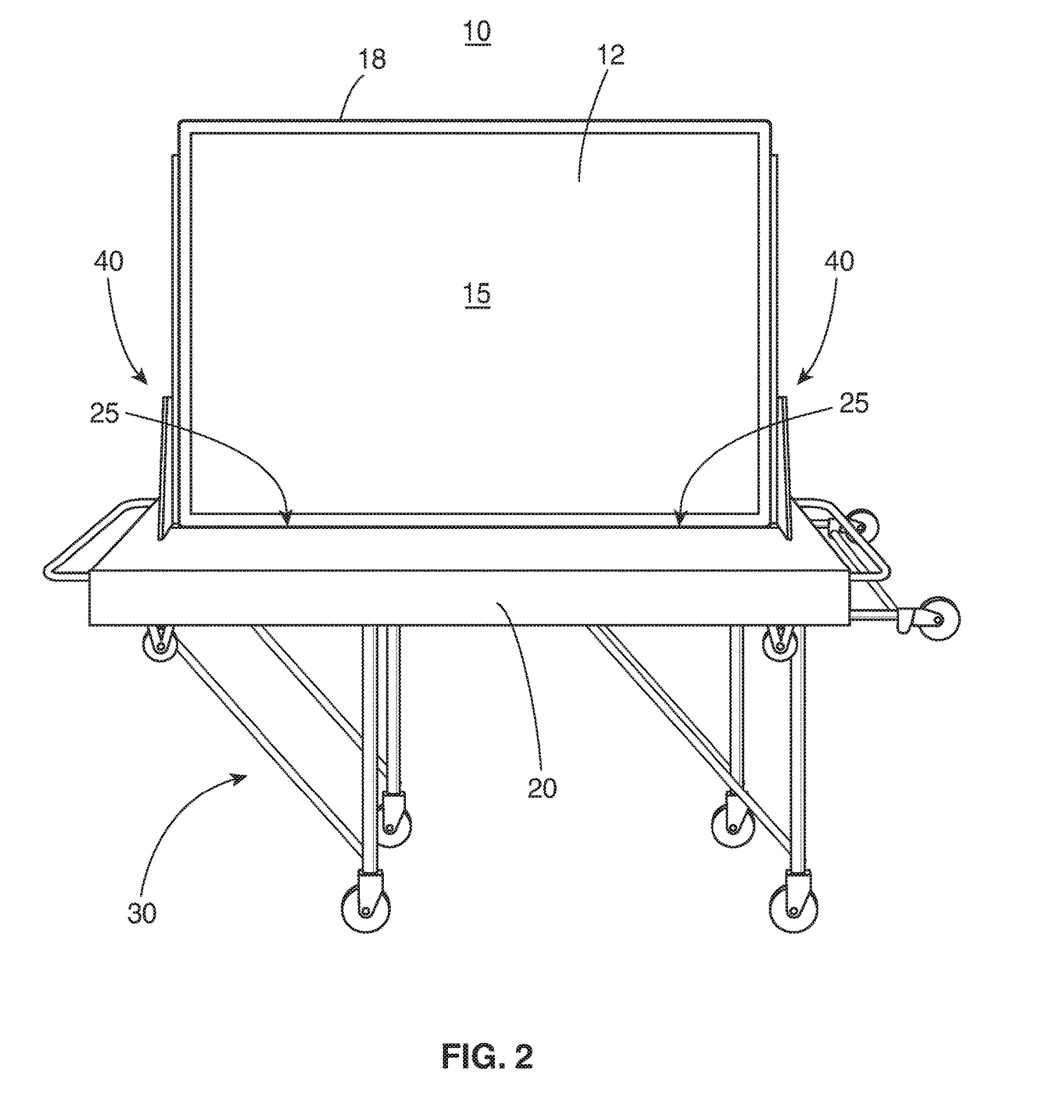
FIG. 2 is a front view of the assembly with the display device disposed in a raised position and with the support assembly or legs disposed in an extended, supporting position, as disclosed in accordance with at least one embodiment of the present invention.

As shown in the accompanying drawings, and with particular reference to FIGS. 1 and 2, the present invention is generally directed to an assembly, unit or cart, generally referenced as 10 that is structured and configured to facilitate the storage, transportation, and use (e.g., viewing) of a television, monitor, display device or other electronic device 12.

In particular, the assembly 10 of at least one embodiment includes a main body 20 and a support assembly 30 connected thereto. The main body 20 may include a top surface 21 defining an elongated slot 25 disposed there through. For instance, the slot 25 or channel of at least one embodiment is vertically disposed completely through the main body 20, for example, through the top surface 21 and a bottom surface and is configured to allow the electronic device or display device 12 to be selectively positioned at least partially through the slot 25 in a vertically sliding manner. Accordingly, the slot 25 or channel of at least one embodiment is positioned in an aligned relation, such as a vertically aligned relation, to the display device 12, and is sized to receive the display device 12 therethrough as disclosed in accordance with the various embodiments of the present invention.

As such, the slot 25 or channel includes a length that is at least equal to or greater than the length of the display device 12 or housing 18, thereof, for example, as defined from one side of the display device 12 or housing 18 to the other side. Similarly, the slot 25 or channel includes a width that is at least equal to or greater than the width of the display device 12 or housing 18, thereof, for example, as defined from the front of the display device 12 or housing 18 to the rear.

Furthermore, the display device 12, as illustrated in the Figures, is a television or monitor, and thus, includes a display screen 15 and a housing or frame 18. The housing or frame 18 of at least one embodiment may include a separate enclosure that at least partially encases the display device 18, including, but in no way limited to, the protective enclosure described in U.S. Pat. No. 8,717,751 issued to Thomas Michael Marker on May 6, 2014, the content of which is incorporated herein in its entirety by reference. It should be noted, however, that the frame or housing 18, as used herein, may be integrally part of the display device 12, and need not be a separate piece or structure. Specifically, the frame or housing 18 of at least one embodiment of the present invention and as used herein may be a separate piece or enclosure within which the television or display device 12 is disposed, or in other embodiments, the frame our housing 18 may be the frame or housing that is integrally part of the display device 12, for example, from the manufacturer. For example, when a television, monitor or other display device is purchased or manufactured, the device will include an outer housing 18 that retains all or most of the electronic components therein.

Referring now to FIGS. 3, 4A, 4B, 5A and 5B, the present invention also includes a positioning assembly 40 which is structured and configured to slidably or movably mount and position the display device 12 to the main body 20. For instance, in one embodiment, the positioning assembly 40 may include a driving assembly, such as a linear actuator, generally referenced as 42, connected between the main body 20 and the display device 12. Specifically, the linear actuator 42 or driving assembly, as used herein, includes any device or apparatus that is structured or configured to create or generate a linear driving force upon the display device 12. That driving force can be exerted upon the display device 12 in order to effectuate the linear sliding movement of the display device relative to the main body 20.

More in particular, the driving assembly or actuator of at least one embodiment is a linear rod actuator, although other actuators, driving assemblies, devices, etc. capable of facilitating a linear or sliding movement of the display device 12 relative to the main body 20 is contemplated within the full spirit and scope of the present invention. For example, the linear actuator 42 of one exemplary embodiment may include a 12 volt DC motor that is capable of producing between 200 and 1000 pounds of force.

Figure 3:
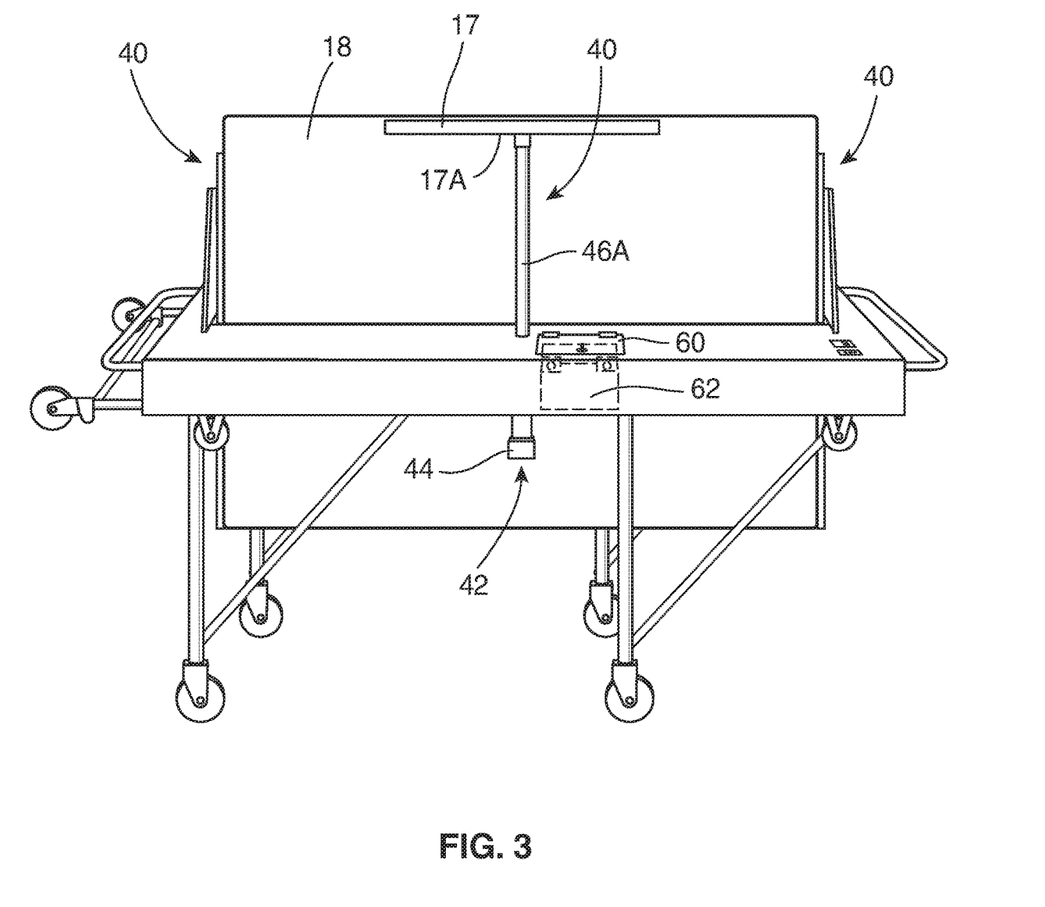
FIG. 3 is a rear view of the assembly with the display device disposed in a lowered position and with the support assembly or legs disposed in an extended, supporting position, as disclosed in accordance with at least one embodiment of the present invention.
Figure 4A:
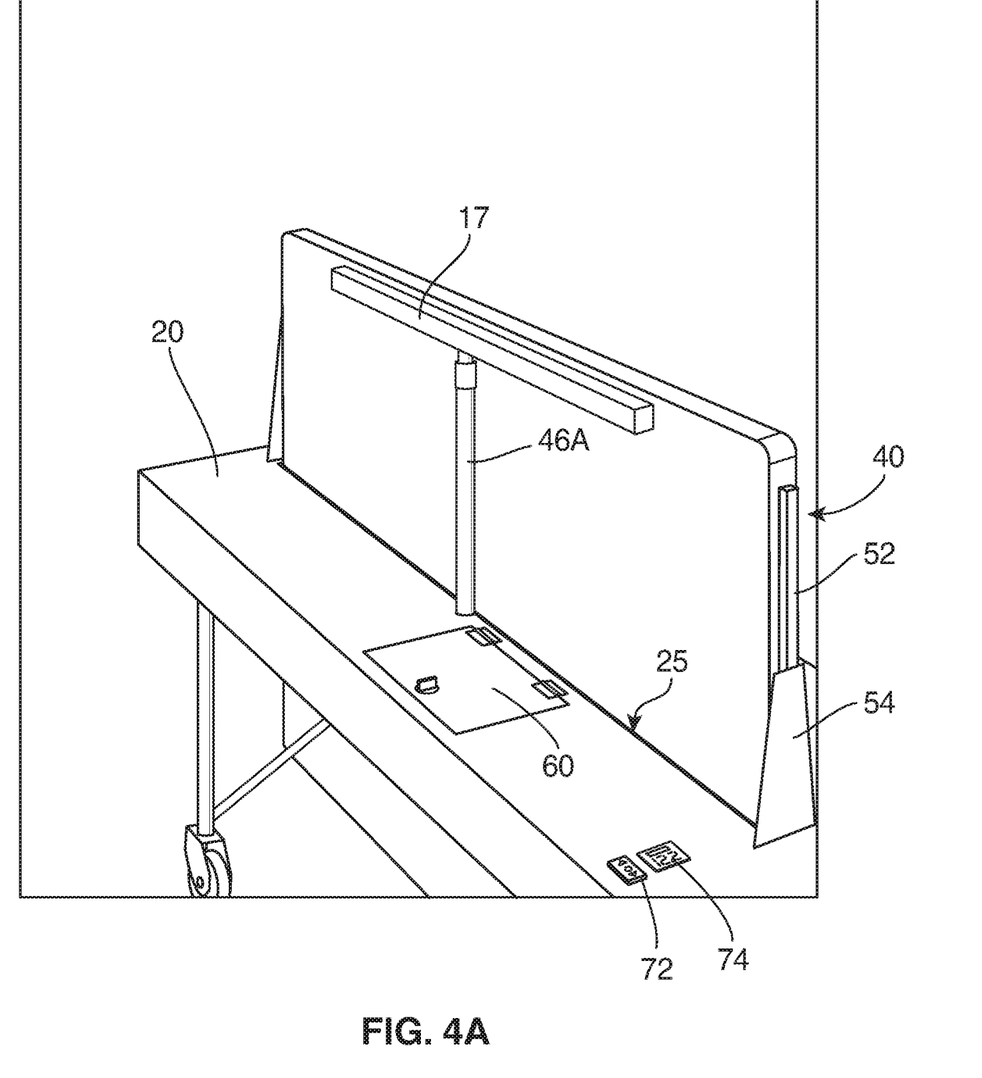
FIG. 4A is a partial rear perspective view of the assembly with the display device disposed in a lowered position and with the support assembly or legs disposed in an extended, supporting position, as disclosed in accordance with at least one embodiment of the present invention.
Figure 4B:
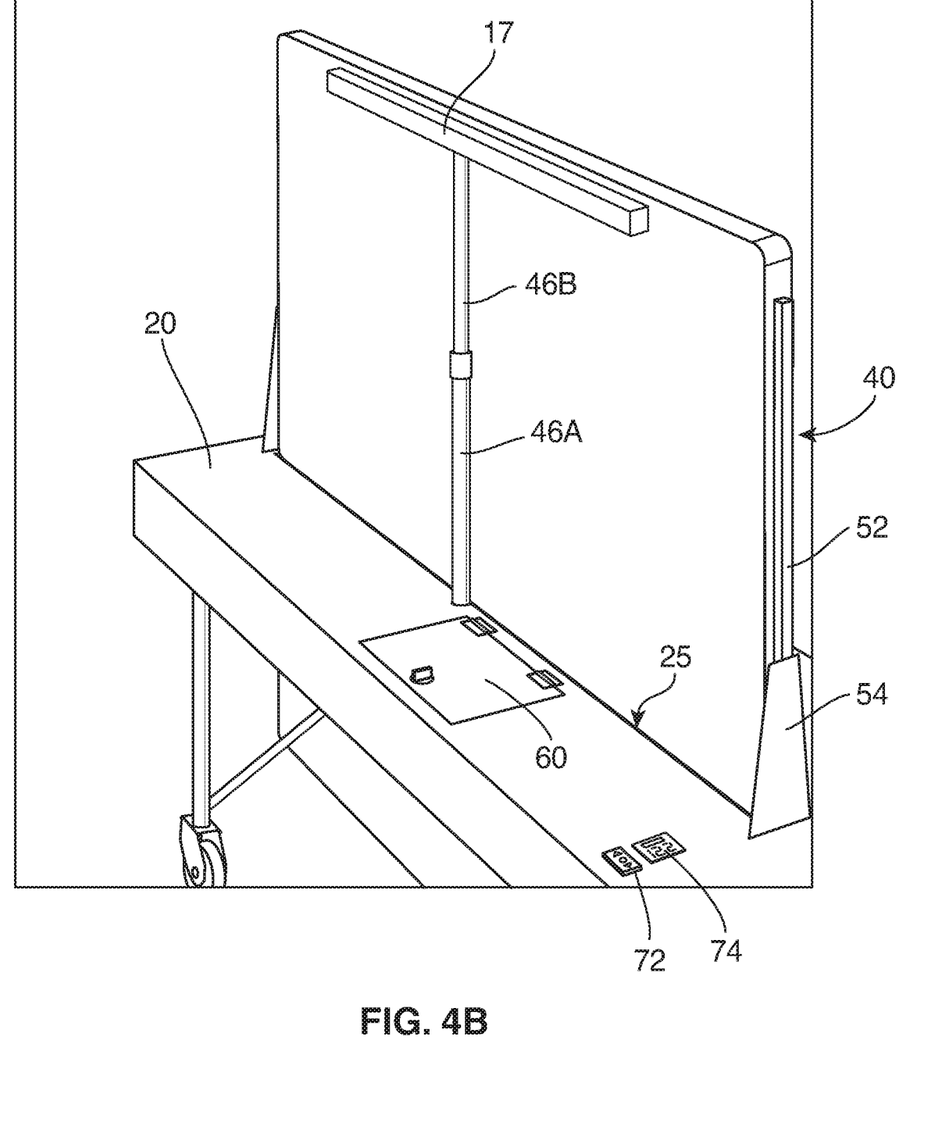
FIG. 4B is a partial rear perspective view of the assembly with the display device disposed in a raised position and with the support assembly or legs disposed in an extended, supporting position, as disclosed in accordance with at least one embodiment of the present invention.

Still referring to FIGS. 3, 4A and 4B, the actuator 42 of at least one embodiment includes a main driver or housing 44, a base shaft 46A and an actuated or moving shaft 46B. Actuated or moving shaft 46B is connected to or otherwise engages support 17. Support 17, as shown in the exemplary embodiment, is a bar, bracket or projection extending from the rear surface of the display device housing 18, and which defines a ledge 17A upon which the moving shaft 46B engages.

As an example, the support 17 can be a piece or structure that is fixed to the display device housing 18 and upon which the actuator 42 exerts a force in order to move display device housing 18. In other embodiment, the support 17 may be integral with or otherwise part of the display device housing 18, and need not be a separate piece fixed thereto. It should also be noted that the actuator 42 or other positioning assembly 40 and support 17 can be installed on different portions of the display device housing 18, such as, the side(s). bottom edge, etc.

In any event, in the illustrated embodiment, the positioning assembly 40, and in particular, the actuator 42 or other driving assembly thereof, is structured to movably dispose or slidingly position the display device housing 18, and the display device 12, between a raised position (e.g., FIGS. 2, 4B, and 5B) and a lowered position (e.g., FIGS. 1, 3, 4A, 5A). For example, starting from the lowered position, in order to slidingly move or dispose the display device housing 18 and/or display device 12 into the raised position, the drive assembly or actuator 42 is activated, which will extend shaft 46B from shaft 46A. In the example, shaft 46A and 46B are telescopically movable, although other embodiments may use different actuators that function or operate differently. As the shaft 46B extends upward, it acts upon support 17 and forces the display housing 18 and/or display device 12 to slide upward, through slot 25 until the display device housing 18 and/or display device 12 is oriented in the raised position. Moving the display device housing 18 and/or display device 12 from the raised position to the lowered position is accomplished by activating the actuator 42 in a manner to lower shaft 46B downward. This will cause the attached display device housing 18 and/or display device 12 to also be lowered or slide downward through the slot 25 until the display device housing 18 and/or display device 12 is disposed in the lowered position.

Moreover, the positioning assembly 40 may, in some embodiments, may include one or more gas shock assists, one or more hydraulic lifts (e.g., similar to a bottle jack), motors, etc. Other embodiments may include rollers, rails, or other mechanisms that allow for manual pushing and pulling the television or mounting assembly between the extended and stored positions.

Furthermore, the raised position of at least one embodiment may be defined as the display screen 15 being disposed at least substantially or entirely above the slot 25 such that the display screen 15 in its entirety is visible and exposed above slot 15 and/or above top surface 21 of the main body 20. In some instances, the entire display device 12 is raised above the slot 25 in the raised position, although it is contemplated that even in the fully raised position, part of the bottom of the display device 12 or housing 18 may extend into the slot 25 or below the top surface 21 of the main body 20.

The lowered position of at least one embodiment may be defined as the display screen being disposed at least partially below the top surface 21 of the main body 20. In the illustrated embodiments, when the device 12 or housing 18 is in the lowered position, part of the device 12 or housing 18 will extend above the slot 25 and part of the device 12 or housing 18 will be within the slot 25. More specifically, in some embodiments, part of the device 12 or housing 18 will extend below the slot 25. Still in other embodiments, when the device 12 or housing 18 is in the lowered position, the entire device 12 or housing 18, or at least a substantial portion of the device 12 or housing 18 will be below the top surface 21 of the main body 20.

Figure 5A:
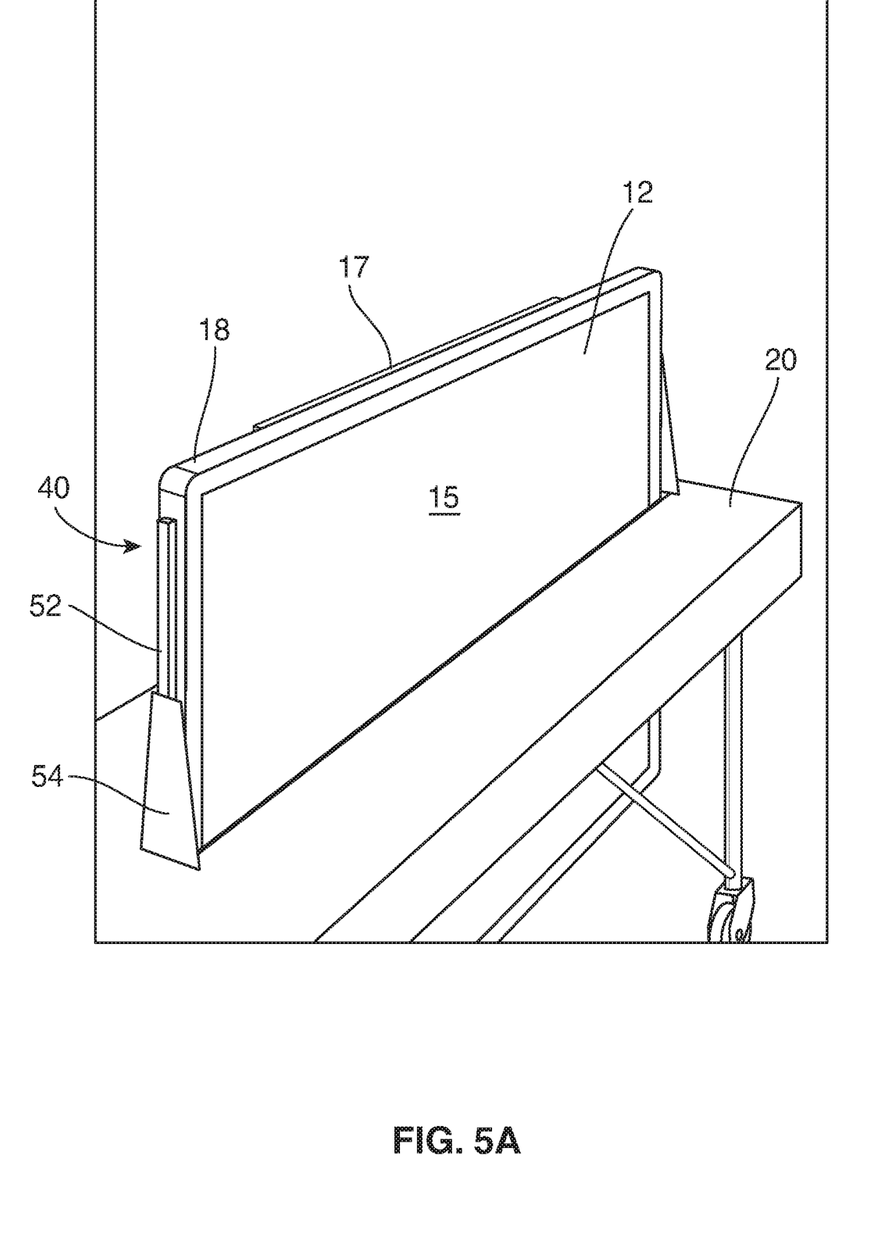
FIG. 5A is a partial front perspective view of the assembly with the display device disposed in a lowered position and with the support assembly or legs disposed in an extended, supporting position, as disclosed in accordance with at least one embodiment of the present invention.
Figure 5B:
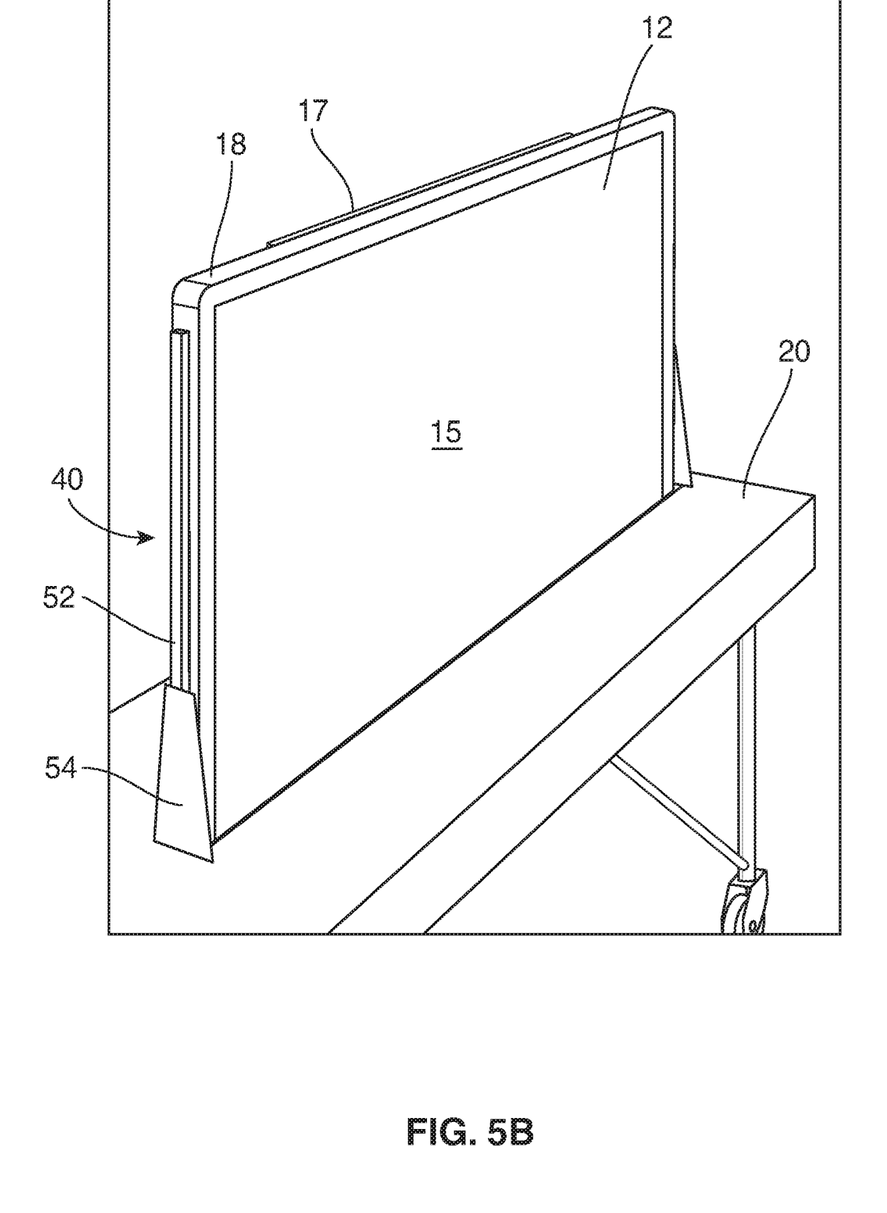
FIG. 5B is a partial front perspective view of the assembly with the display device disposed in a raised position and with the support assembly or legs disposed in an extended, supporting position, as disclosed in accordance with at least one embodiment of the present invention.

Referring now to FIGS. 5A and 5B, the positioning assembly 40 of at least one embodiment also includes one or more rails 52 and rail guides 54. For example, rails 52 may be fixedly connected to the display device 12 and/or display device housing 18, and are structured and disposed to slide relative to corresponding rail guides 54 connected to the main body 20. In particular, the one or more rail(s) 52 may be mounted to the frame or housing 18 of the display device 12. As shown in FIGS. 4A through 5B, the rails 52, such as first and second rails, are fixed to opposite sides of the display device 12 or display device housing 18, for example, in a vertically elongated manner. The rail(s) 52 may be mounted to the frame or housing with adhesive, screws, bolts, etc. or, in some cases, the rails 52 may be integral with or part of the display device housing 18.

Moreover, rail guides 54 of at least one embodiment are fixed or connected to the main body 20 and include corresponding guides, grooves, or channels, for example, through which the rails 52 may slide or move as the display device 12 or display device housing 18 moves between the raised position and the lowered position. As an example, the rail guides 54, such as first and second rail guides, may be mounted to the main body 20 on opposite longitudinal sides of the slot 25 or channel and correspondingly aligned with the first and second rails 52 attached or secured to the display device 12 or housing 18. Accordingly, the rails 52 and corresponding rail guides 54 are structured to facilitate a smooth transition between the raised and lowered positions of the display device 12 and/or display device housing 18 through slot 25.

Figure 6:
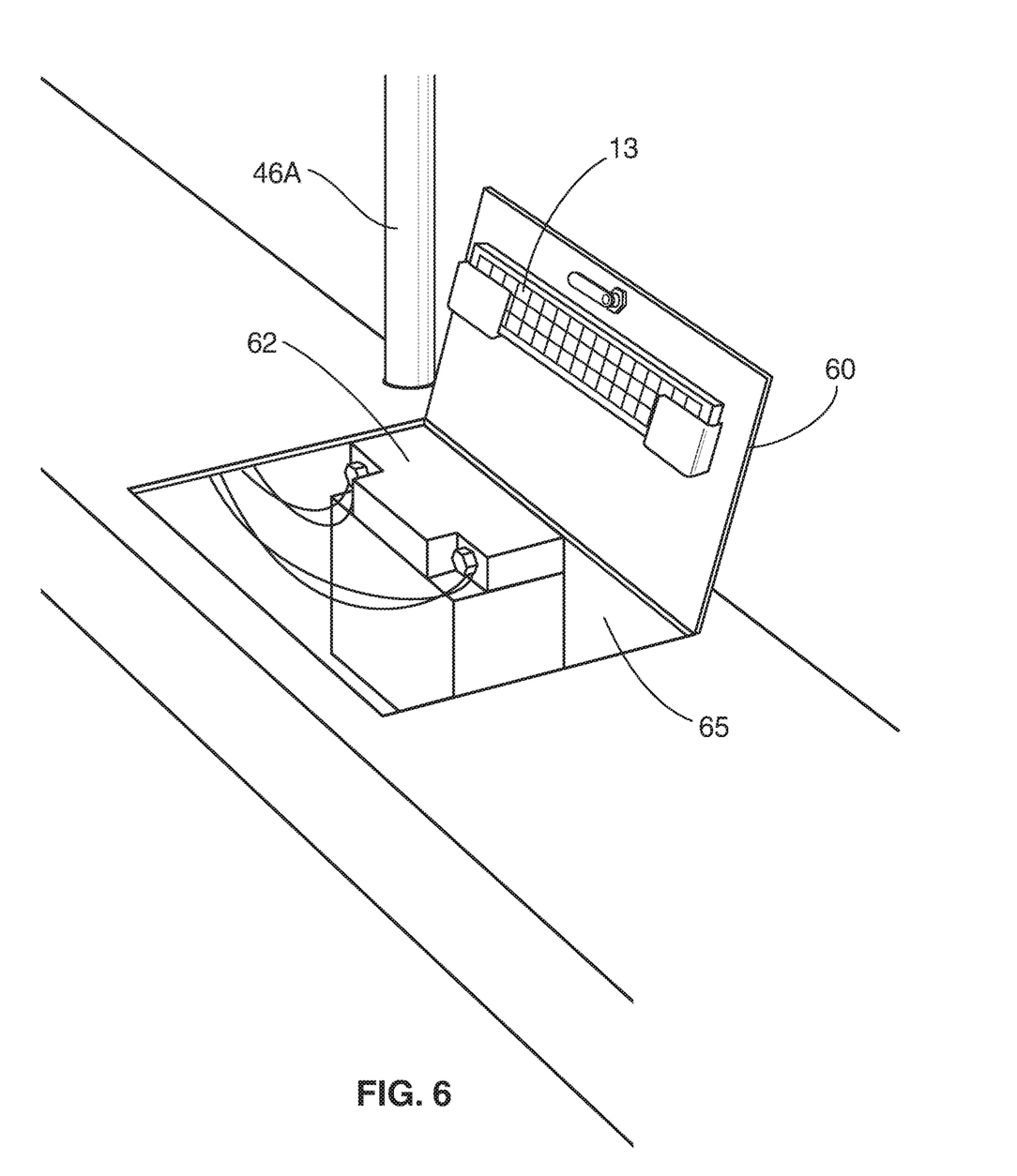
FIG. 6 is a partial perspective view of the power supply as disclosed in accordance with at least one embodiment of the present invention.

Referring now to FIG. 6, at least one embodiment of the present invention includes a power supply 62, for example, in the form of one or more batteries. As just an example, the power supply may be, but is certainly not limited to, a 12 volt motorcycle battery, automotive battery, etc. Furthermore, as shown in FIG. 6, the power supply 62 may be disposed within a compartment 60 maintained on or within the main body 20. Compartment 65 may be accessed, for example, by opening lid 60, although other compartments, lids, cabinets, etc. are contemplated. Additionally, other locations for the power supply 62 are contemplated within the full spirit and scope of the present invention.

In particular, the one or more batteries or power supply 62 of at least one embodiment may be electrically connected to the actuator 42 of the positioning assembly 40 in a manner to provide power to the actuator 42. This allows the actuator 42 of at least one embodiment of the present invention to be operated or operable without the need for an external source of power.

It should also be noted that in some embodiments, the power supply 62 may be electrically connected to the display device 12 in a manner to provide power to the display device 12. This allows the display device 12, such as a television or monitor, to be powered and operable in the absence of an external power source, such as an outlet or generator. The power supply 62 of certain embodiment disclosed herein may be used to power or provide electricity to other components of the assembly 10, including, for example, the support assembly 30.

Furthermore, as shown in FIG. 6, a remote control 13 may be disposed or mounted within compartment 60 for easy access. Other embodiments many mount or store the remote control (if any) in other locations, however.

As shown in FIGS. 4A and 4B, for example, the assembly 10 may include a control panel comprising a control 72 operable to activate the actuator 42 or positioning assembly 40. For example, control 72 of at least one embodiment can be pushed or activated in one manner (e.g., by activating the up arrow) to raise the display device 12 or housing 18, and in another manner (e.g., by activating the down arrow) to lower the display device 12 or housing 18. Other controls, including touch screen controls, buttons, rocker switches, etc. are contemplated.

Furthermore, in at least one embodiment, a display panel 74 may be provided which is structured to display a current status of the power supply 62, for example, the voltage of the one or more batteries. Accordingly, a voltmeter, multimeter or other instrument used to measure the status of the power supply 62, e.g., a voltage, current, etc., may be connected to the power support 62 and display panel 74. In the illustrated example, the display panel 74 reads 12.2 volts.

In addition, the present invention also includes a support assembly 30 attached to the main body 20, for example, to the bottom of the main body 20. As provided herein, the support assembly 30 facilitates transportation of the assembly 10, whether on the ground or in a vehicle. Accordingly, the support assembly 30 of at least one embodiment includes a plurality of collapsible legs 32 disposable between an extended, supporting position (e.g., FIGS. 1-5B) and a collapsed position (e.g., FIG. 7). For instance, the legs 32 extend down from the main body 20, for example, from a bottom surface thereof, each terminating with one or more wheels 33. In some embodiments, leg supports 34 extend at an angle between the main body 20 and a corresponding leg 32, as shown.

The legs 32 may swing upward toward the main body 20, for example, in direction of arrows A1 and A2, in order to dispose the legs 32 from the extended position to the collapsed position. When the legs 32 are in the collapsed position, the legs 32 may be locked into place, e.g., with corresponding clips, tabs, or other locking assemblies known in the art. This will prevent or restrict the legs 32 from extending until desired. It should also be noted that the legs 32 or support assembly 30 may be electrically driven, pneumatically driven or manually operated. In other words, the legs 32 may be positioned between the extended and collapsed positions manually in some embodiments, while other embodiment may provide or include electrically driven, pneumatically driven or other legs 32.

Furthermore, the support assembly 30 of at least one embodiment may also include a secondary wheel set comprising a plurality of secondary wheels 35, 36. In particular, the secondary wheels 35 may extend from the main body 20, such as, from a bottom surface thereof and are disposed in close proximity to the main body 20. In other words, when the collapsible legs 32 are disposed in the extended, supporting position, the plurality of secondary wheels 35, 36 are disposed closer to the main body 20 or otherwise higher up from the ground than the wheels 33 of the larger, collapsible legs 32.

Figure 7:
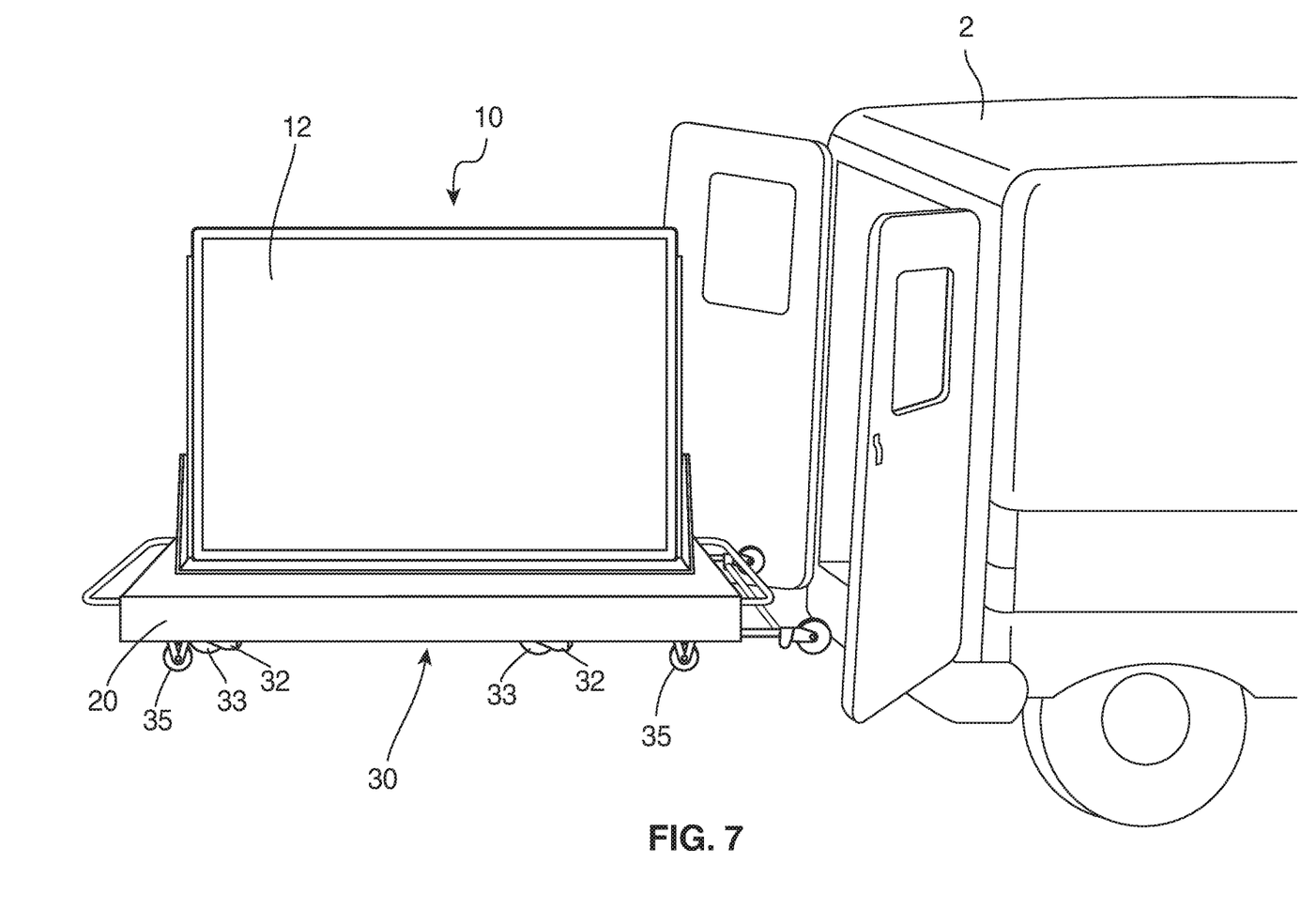
FIG. 7 is a front view of the assembly with the display device disposed in a raised position and with the support assembly or legs disposed in a collapsed position, as disclosed in accordance with at least one embodiment of the present invention.

Referring to FIG. 7, for example, with the collapsible legs 32 of the support assembly 30 collapsed and folded upward into the bottom of main body 20, and with the display device 12 or display device housing 18 disposed in the raised position, the assembly 10 can be easily inserted into a vehicle 2. The vehicle 2 shown is a standard van with rear opening doors and a cargo area sufficient in size to receive the assembly 10 therein. Other vehicles can include, for example, but not limited to, pickup trucks, moving vans, sports utility vehicles (SUVs), minivans, cars, trucks, etc.

In any event, with the collapsible legs 32 folded or collapsed, the secondary wheels 35, 36 of at least one embodiment can be used to support the assembly 10 upon a support surface, such as, a cargo floor of the vehicle. This allows the assembly 10 to be easily inserted into the vehicle 2 or other location for transportation or storage. For example, in some embodiments, the main body 20 and support assembly 30 of the present invention operate similar to a gurney or wheeled stretched used to transport patients, for example, into and out of emergency vehicles. Other embodiments may include other types or styles of collapsible or foldable legs. Either way, the legs include one or more wheels that allow the cart or assembly 10 to be easily maneuvered or traversed across various surfaces, including pavement, parking lots, or rough ground.

Moreover, as provided below, and with reference to FIGS. 8, 9 and 10, in at least one embodiment, a cover 100 and/or attachment assembly 200 may be used when transporting the assembly 10 in a vehicle 2.

Figure 8:
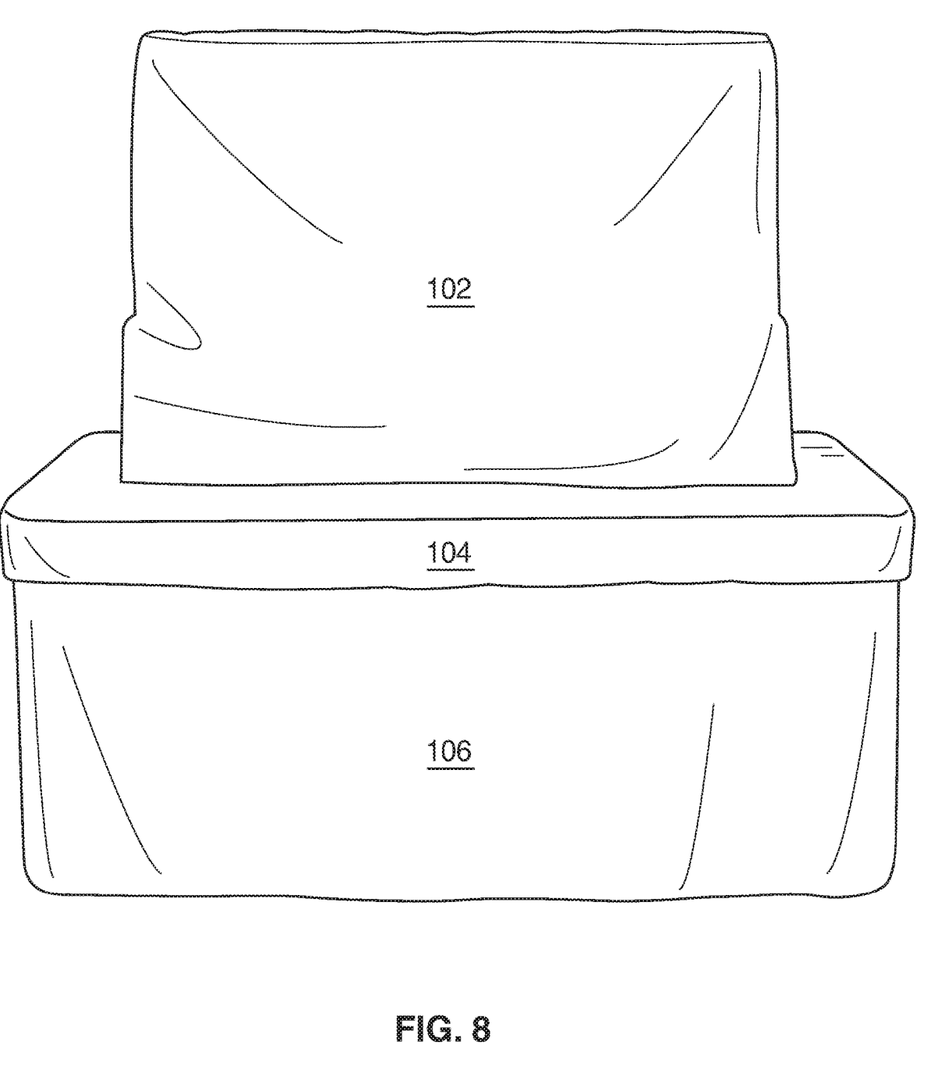
FIG. 8 is a front view of the assembly with a protective cover disposed thereon, as disclosed herein.

Specifically, with reference to FIG. 8, an optional or additional cover 100 may be provided to protect or cover the assembly, including the display device 12, housing 18, main body 20 and support assembly 30 (not shown as being hidden under the cover 100 in FIG. 8). In particular, the cover 100 may be made of, but is certainly not limited to, a protective and durable material, such as a cloth, woven or non-woven polyester, polyvinyl chloride material, etc.

Furthermore, the cover 100 may include a section or portion 102 configured to at least partially cover or protect the display device or housing, a section or portion 104 configured to at least partially cover or protect the main body 20, and a section or portion 106 that hangs down below section 104 and which surrounds the support assembly 30. In some embodiments, the sections 102, 104, 106 may be integrally formed with one another, while in other embodiments, one or more of the sections may be separable from the other sections. For example, in one embodiment, the bottom section 106 or skirt that surrounds the support assembly 30 or legs may be selectively separated from the middle section 104 which surrounds the main body 20. As will become apparent below, separating the bottom section 106 may be useful when transferring the assembly into or out of a vehicle. In this manner, the skirt or bottom section 106 may be removably attached to section 104 of the cover 100, for example, via snaps, VELCRO, buttons, zippers, magnets, etc. In other embodiments, section 104 may be separable from section 102, in a similar fashion, e.g., via one or more snaps, VELCRO, buttons, zippers, magnets, etc.

Figure 9:
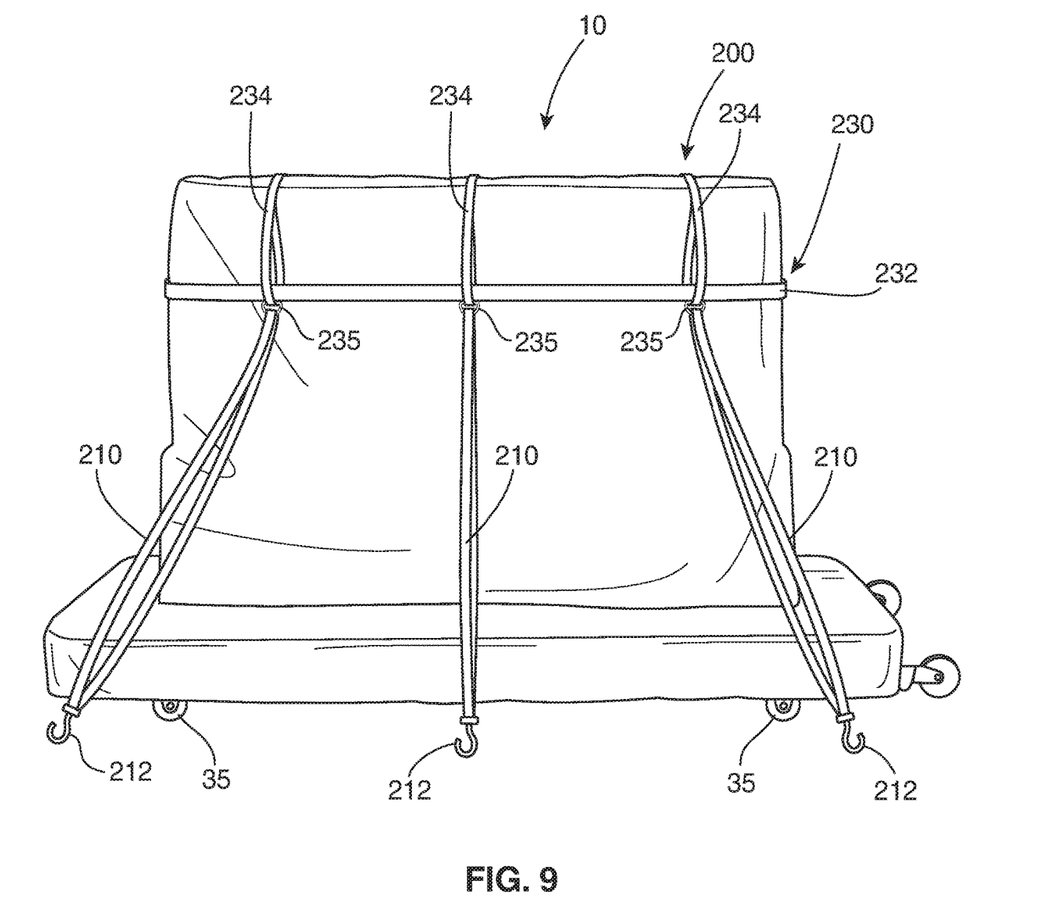
FIG. 9 is a front view of the assembly with the attachment assembly as disclosed in accordance with at least one embodiment of the present invention.
Figure 10:
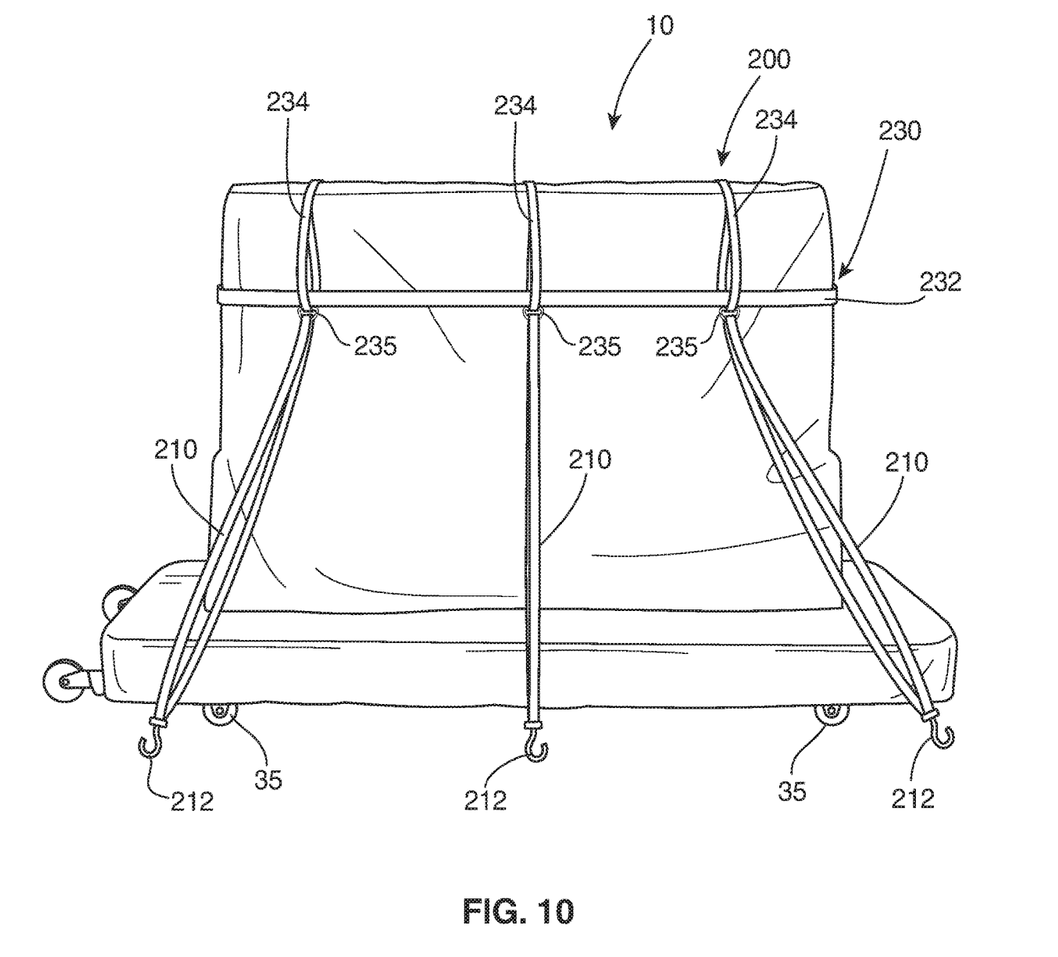
FIG. 10 is a rear view of the assembly with the attachment assembly as disclosed in accordance with at least one embodiment of the present invention.

FIGS. 9 and 10 illustrate the assembly 10 with the bottom section 106 removed. Oftentimes, it may be desirable to transport the assembly 10 in a vehicle with the cover 100 disposed at least over the display device 12 or display device housing 18 for protection and to prevent or minimize damage to the display device 12 or in some cases, to the main body 20 and other components thereof. Furthermore, and attachment assembly 200 may be used to restrain the assembly 10, for example, within the vehicle 2 or other location including a storage location, if desired.

For example, the attachment assembly 200 of at least one embodiment is secured to the assembly 10 (e.g., with or without the cover 100) and includes at least one, but more practically a plurality of attachment straps or members extending from the assembly 10 and terminating at a free distal end 212. The free distal end 212 can then be secured to an external location, such as a portion of the vehicle 2. In this manner, the free distal ends 212 of the attachment members 210 may include hooks (as illustrated) which can hook onto, into or around various portions of the vehicle or other stable location. In other embodiments, the free ends 212 may include other connections such as clips, clasps, VELCRO, magnets, etc. It should also be noted that the attachment members 210 may include a durable strap, such as a nylon strap, or in other cases, the attachment members 210 may have an elasticity such as that similar to a bungee cord.

Moreover, in at least one embodiment, the attachment assembly 200 includes a base attachment apparatus 230 that is secured to the assembly 10 (with or without the cover 100). The attachment member(s) 210 will then secure to or otherwise extend from the base attachment apparatus 230. For example, the base attachment apparatus 230 may include a base strap or base member 232 secured laterally around the assembly 10, for example, spanning around the sides, front and back of the apparatus, as shown in FIGS. 9 and 10. The base attachment apparatus 230 may also include one or more intermediate straps or members 234 secured to the base member 232 and positioned over a top edge of the assembly 10. For example, one of the intermediate members 234 may secure to the base member 232 in two separate locations, one on the front surface of the assembly and one on the back surface of the assembly. A connector 235, such as a D-ring, O-ring, or other similar device, can be used to interconnect the attachment member(s) 210 to the base attachment apparatus 230.

In this manner, the attachment assembly 200 can be used to secure the assembly 10 within the vehicle and prevent or restrict movement or excess movement thereof, particularly while the vehicle 2 is moving.

Additionally, in some embodiments, a handle may also be attached to one or more ends of the main body 20. In some cases or embodiments, the one or more handles may be retractable, foldable or pivotal in order to extend the handle(s) into and out of an operable and stored position and/or into and out of various different operable positions.

Furthermore, in at least one embodiment, the main body 20 may include or be equipped with one or more media and/or power ports, including, but not limited to HDMI, USB, 3.5 mm audio, etc. For example. The display device 12 may plug into a first set of port(s), which are communicatively connected to a second set of externally accessible ports (e.g., disposed on one or more sides or rear of the main body 20).

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention. This written description provides an illustrative explanation and/or account of the present invention. It may be possible to deliver equivalent benefits using variations of the specific embodiments, without departing from the inventive concept. This description and these drawings, therefore, are to be regarded as illustrative and not restrictive.

Now that the invention has been described,

What is claimed is:

1. An assembly to support and transport a display device, said assembly comprising: a main body comprising an elongated slot vertically disposed therethrough, a display device housing, a positioning assembly, wherein said display device housing is movably mounted to said main body via said positioning assembly, and wherein said display device housing is selectively positionable between a raised position and a lowered position via said positioning assembly, a support assembly attached to said main body, said support assembly comprising a plurality of collapsible legs disposable between an extended supporting position and a collapsed position; wherein said positioning assembly comprises at least one rail fixedly attached to said display device housing and at least one rail guide fixedly attached to said main body, wherein said at least one rail is movably disposable relative to said at least one rail guide.

2. The assembly as recited in claim 1 wherein said positioning assembly comprises at least two rails fixedly attached to said display device housing, and at least two rail guides fixedly attached to said main body, wherein a first one of said at least two rails is movably disposable relative to a first one of said at least two rail guides and a second one of said at least two rails is movably disposable relative to a second one of said at least two rail guides.

3. The assembly as recited in claim 2 wherein said positioning assembly further comprises a linear actuator interconnected between said main body and said display device housing, said linear actuator being configured to selectively position said display device housing between said raised position and said lowered position.

4. The assembly as recited in claim 3 further comprising a power supply, said power supply being disposable in an electrically connected relation to said linear actuator.

5. The assembly as recited in claim 4 wherein said power supply comprises a battery.

6. The assembly as recited in claim 5 further comprising a control panel, said control panel comprises an activator to electrically and selectively activate said positioning assembly.

7. The assembly as recited in claim 1 wherein said support assembly comprises a plurality of wheels disposed on corresponding ends of said plurality of collapsible legs.

8. The assembly as recited in claim 7 wherein said support assembly further comprises a secondary wheel set, said secondary wheel set comprising a plurality of secondary wheels extending from said main body, wherein, when said plurality of collapsible legs are disposed in said extended supporting position, said plurality of secondary wheels are disposed closer to main body than said plurality of wheels disposed on said corresponding ends of said plurality of collapsible legs.

9. The assembly as recited in claim 8 wherein, when said plurality of collapsible legs are disposed in said collapsed position, said plurality of secondary wheels are disposable in a contacting relation with a supporting surface.

10. The assembly as recited in claim 1 further comprising an attachment assembly removably secured to said display device housing, said attachment assembly comprising at least one attachment strap with a free distal end.

11. The assembly as recited in claim 10 wherein said attachment assembly comprises a base attachment apparatus secured to said display device housing and a plurality of outwardly extendable attachment members connected to said base attachment apparatus, each of said outwardly extendable attachment members comprising a free distal end.

12. The assembly as recited in claim 10 wherein said base attachment apparatus comprises a base strap secured laterally around said display device housing and at least one intermediate strap secured to said base strap and positioned over a top edge of said display device housing.

13. The assembly as recited in claim 12 further comprising a protective covering disposable in a covering relation to said display device housing, wherein said attachment assembly is secured on the outside of said protective covering.

14. The assembly as recited in claim 1 wherein said raised position is defined as said display screen housing being disposed at least substantially above said vertical slot, and wherein said lowered position is defined as said display screen housing being disposed from said extend position and at least partially downward through said vertical slot.

15. The assembly as recited in claim 14 wherein said display screen housing is disposed at least partially within said vertical slot at least when said display screen housing is disposed in said lowered position.

16. An assembly to support and transport a display device, said assembly comprising:
- a main body comprising an elongated vertical slot disposed therethrough,
- a display device comprising a display screen and a housing,
- a positioning assembly, said display device being movably mounted to said main body via said positioning assembly,
- said positioning assembly comprises a first rail fixedly attached to a first side of said display device and a second rail attached to a second side of said display device, said positioning assembly further comprising a first rail guide fixedly attached to said main body and a second rail guide fixedly attached to said main body, wherein said first rail is movably disposable relative to said first rail guide, and said second rail is movably disposable relative to said second rail guide,
- said display device being positionable between a raised position and a lowered position via said positioning assembly, said raised position being defined as said display screen of said display device being disposed above a top surface of said main body, said lowered position being defined as said display screen of said display device being disposed at least partially below said top surface of said main body,
- a support assembly attached to said main body, said support assembly comprising a plurality of collapsible legs disposable between an extended supporting position and a collapsed position, said plurality of collapsible legs comprising a plurality of wheels disposed on corresponding ends thereof,
- said support assembly comprising a secondary wheel set comprising a plurality of secondary wheels extending from said main body, wherein, when said plurality of collapsible legs are disposed in said extended supporting position, said plurality of secondary wheels are disposed closer to main body than said plurality of wheels disposed on said corresponding ends of said plurality of collapsible legs.

17. The assembly as recited in claim 16 further comprising an attachment assembly removably secured to said display device, said attachment assembly comprising at least one attachment strap with a free distal end.

18. The assembly as recited in claim 17 wherein said attachment assembly comprises a base attachment apparatus secured to said display device and a plurality of outwardly extendable attachment members connected to said base attachment apparatus, each of said outwardly extendable attachment members comprising a free distal end.

19. The assembly as recited in claim 18 further comprising a protective covering disposable in a covering relation to said display device.

* * * * *